United States Patent
Winter et al.

(10) Patent No.: US 7,593,838 B2
(45) Date of Patent: Sep. 22, 2009

(54) MODEL-SUPPORTED ALLOCATION OF VEHICLES TO TRAFFIC LANES

(75) Inventors: Klaus Winter, Schwieberdingen (DE); Jens Lueder, Kornwestheim (DE); Werner Kederer, Riemerling (DE); Juergen Detlefsen, Arcisstrasse (DE)

(73) Assignee: Robert Bosch GmbH, Stuttgart (DE)

( * ) Notice: Subject to any disclaimer, the term of this patent is extended or adjusted under 35 U.S.C. 154(b) by 525 days.

(21) Appl. No.: 09/980,146

(22) PCT Filed: Mar. 8, 2001

(86) PCT No.: PCT/DE01/01190

§ 371 (c)(1), (2), (4) Date: Jun. 24, 2002

(87) PCT Pub. No.: WO01/73473

PCT Pub. Date: Oct. 4, 2001

(65) Prior Publication Data

US 2002/0183928 A1 Dec. 5, 2002

(30) Foreign Application Priority Data

Mar. 28, 2000 (DE) ................. 100 15 111

(51) Int. Cl.
*G06G 7/48* (2006.01)
*B60T 8/32* (2006.01)
*B60T 7/12* (2006.01)

(52) U.S. Cl. ................. 703/8; 701/93; 701/96

(58) Field of Classification Search ........... 703/8; 701/300, 93, 200, 96
See application file for complete search history.

(56) References Cited

U.S. PATENT DOCUMENTS

| | | | | | |
|---|---|---|---|---|---|
| 4,063,237 | A | * | 12/1977 | Nier et al. .................. 342/6 |
| 5,063,857 | A | * | 11/1991 | Kissel, Jr. ............... 104/88.04 |
| 5,440,109 | A | * | 8/1995 | Hering et al. .............. 235/384 |
| 5,555,555 | A | * | 9/1996 | Sato et al. .................. 382/104 |
| 5,642,093 | A | * | 6/1997 | Kinoshita et al. ........... 340/439 |
| 5,710,565 | A | | 1/1998 | Nishimura et al. |
| 5,761,629 | A | * | 6/1998 | Gilling .................. 701/96 |
| 5,901,806 | A | * | 5/1999 | Takahashi ................ 180/170 |
| 5,949,365 | A | * | 9/1999 | Wagner ................... 342/70 |
| 5,959,569 | A | * | 9/1999 | Khodabhai ................ 342/70 |
| 5,964,822 | A | * | 10/1999 | Alland et al. .............. 701/301 |
| 5,977,906 | A | | 11/1999 | Ameen et al. |
| 5,999,874 | A | * | 12/1999 | Winner et al. ............... 701/93 |
| 6,026,353 | A | * | 2/2000 | Winner ................... 702/183 |
| 6,138,064 | A | * | 10/2000 | Matsumoto et al. ........... 701/23 |
| 6,311,123 | B1 | * | 10/2001 | Nakamura et al. ........... 701/96 |
| 6,388,565 | B1 | * | 5/2002 | Bernhard et al. ........... 340/435 |
| 6,489,887 | B2 | * | 12/2002 | Satoh et al. ............... 340/436 |
| 6,526,352 | B1 | * | 2/2003 | Breed et al. .............. 701/213 |
| 6,653,935 | B1 | * | 11/2003 | Winner et al. .............. 340/435 |

FOREIGN PATENT DOCUMENTS

| | | |
|---|---|---|
| DE | 197 22 947 | 2/1999 |
| GB | 2 317 256 | 3/1998 |

* cited by examiner

*Primary Examiner*—Paul L Rodriguez
*Assistant Examiner*—Andre Pierre Louis
(74) *Attorney, Agent, or Firm*—Kenyon & Kenyon LLP

(57) ABSTRACT

A method as well as a device for the lane allocation of consecutive vehicles, the lane allocation being carried out in a model-based manner via a frequency distribution of the lateral displacements of detected radar objects. The method is additionally used for detecting the misalignment of the sensor.

2 Claims, 2 Drawing Sheets

MODEL-SUPPORTED ALLOCATION OF VEHICLES TO TRAFFIC LANES

FIELD OF THE INVENTION

The present invention relates to a method for the lane allocation of consecutive vehicles. In the past couple of years, numerous publications have become known that address an automatic regulation of the speed of a vehicle while taking into consideration the distance to vehicles driving ahead. Such systems are often referred to as adaptive cruise control (ACC).

BACKGROUND INFORMATION

A fundamental description of such a device is included, for example, in the paper "Adaptive Cruise Controls—System Aspects and Development Trends," given by Winner, Witte et al., at SAE 96, Feb. 26 to 29, 1996 in Detroit (SAE Paper No. 961010). To detect vehicles traveling ahead and stationary as well as moving objects, the majority of the known systems use a microwave radar beam or an infrared lidar beam. This beam is reflected by the objects and received by the sensor, thereby making it possible to determine the relative position and relative speed of the object. The future travel-path area of the vehicle can be predicted from this information, as is described in detail in German Patent No. DE 197 22 947 C1.

SUMMARY OF THE INVENTION

It is an object of the present invention to make it possible to detect a lane from reflected signals as well as to detect one's own lane of travel, and, if applicable, to detect horizontal misalignment. Advantageously, the adaptive vehicle speed controller can be adjusted to multi-lane roads because there are typically vehicles traveling in succession on such roads. By lane detection as well as by detecting one's own lane of travel, the moving objects located in front of one's own vehicle can be allocated to the appropriate lanes. By allocating these objects to the lanes, the target object traveling directly ahead can be reliably determined, the target object's speed and acceleration determining the driving behavior of one's own, sensor-controlled vehicle. This lane allocation is carried out in that reference models for roads having many different lanes as well as for the navigation of the different lanes are stored in a memory of the sensor. By inputting the acquired measured data in a lateral displacement histogram in which the frequency distribution of the lateral displacements of the individual objects are entered, this instantaneous measuring diagram can be correlated with the stored reference models. The reference model having the greatest similarity to the instantaneous measuring diagram provides information as to how many lanes the road has and in which lane the vehicle is currently located. This result is output as a so-called lane hypothesis. By evaluating the lateral displacements of the reflection objects as a function of their longitudinal distance, i.e., the distance between the sensor and the reflection object, which extends parallel to the center axis of the vehicle, a misalignment can be detected. An advantage of the present invention is to output a lane hypothesis via this simple analysis method of sensor data and to detect a potentially existing sensor misalignment.

DETAILED DESCRIPTION

It is essential for a frequency distribution of the lateral displacements of detected radar objects to be determined. A radar object is an object confirmed, in each case, from one measurement to the next measurement by comparing predicted distance, lateral displacement, and relative speed data to ascertained measured data. The following treatments of the radar object data have proven to be effective: (a) initial filtering, i.e., every radar object is only taken into consideration once for the lateral displacement histogram; or (b) weighting the individual objects in the histogram as a function of the number of individual measurements of the individual radar objects. Displacement (dyv), which relates to the vehicle center, or, to compensate for changes in lateral displacement due to cornering, lateral displacement (dyc), which relates to the course of the ACC vehicle, can be used as the input quantity, lateral displacement. The determined frequency distribution is correlated to a model for frequency distributions relating to lane allocation for multi-lane roads (e.g. 3 lanes) having a defined width or, alternatively, to characteristic lateral displacement histograms for the different lanes used by the ACC vehicle. The model part having the highest correlation to the determined frequency distribution is output as the lane hypothesis (number of lanes and one's own lane of travel).

Figure 1:
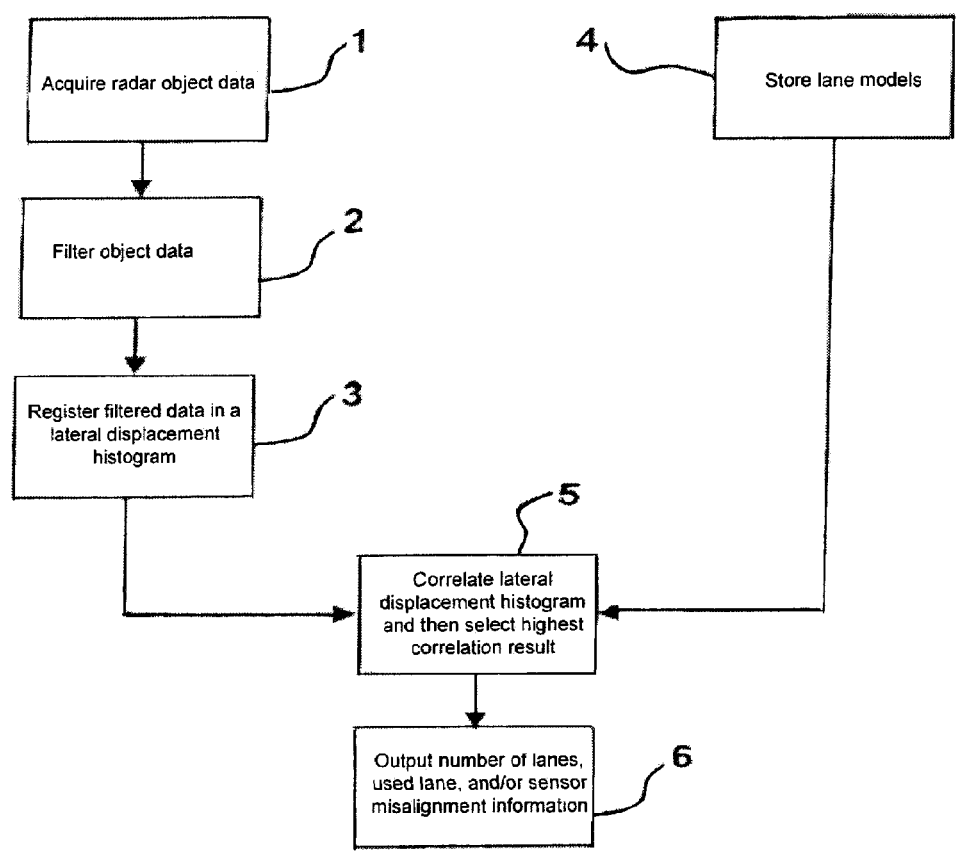
FIG. 1 shows a block diagram of the model-based lane and misalignment detection.

FIG. 1 shows a model-based lane and misalignment detection. In block 1 of the flow chart, the radar object data, such as distance, relative speed, and lateral displacement, are acquired from the measured data of the radar sensor. In a next step, these are filtered in an object filter represented as block 2. This filtering can be carried out in different ways. Advantageously, this is performed either in that every object is only taken into consideration once for the lateral displacement histogram or in that every object is taken into consideration with a weighting, the weighting being dependent upon how many times an object was detected in individual measurements. This filtered data is then registered in a lateral displacement histogram represented in block 3. The frequency of the filtered object data is stored in the lateral displacement histogram as a function of the measured lateral displacement of the vehicle's longitudinal axis. Lane models, which are used as reference histograms, are stored in block 4. These reference histograms are either model-like lane models or empirically obtained lane models. An individual, characteristic reference histogram is stored for every type of road, whether it has oncoming traffic or not and whether it has one or more lanes in one direction, and for the use of each lane. In block 5, the instantaneously determined, current lateral displacement histogram from block 3 is correlated to every reference model stored in block 4. The result of every correlation from the instantaneous lateral displacement histogram to one of the reference models is a correlation result that increases as the similarity of the instantaneous lateral displacement histogram to the reference histogram increases. By selecting the reference histogram having the highest correlation result in block 5, the number of lanes, the used lane, as well as a possible misalignment of the radar sensor can be deduced. In block 6, this acquired information is output and made available for further processing. The flow chart shown in FIG. 1 is arbitrarily run through many times, i.e., when a lane hypothesis and, if applicable, a sensor misalignment are determined in block 6, the sequence begins again in that new radar data is processed in block 1 as described. According to the number of detected lanes and their relative position with respect to one's own vehicle, a histogram having a plurality of maxima is obtained in block 3. The horizontal misalignment of the radar sensor can be determined from the position of the average values for the lanes in the histogram with respect to the vehicle center axis. For this purpose, in addition to lateral displacement dyv or, alternatively, dyc, a further histogram regarding the distance of the observed object must be stored with equivalent object treatment (type (a) or (b)), and a misalignment angle must be determined by determining the centroid of the histograms.

Figure 2:
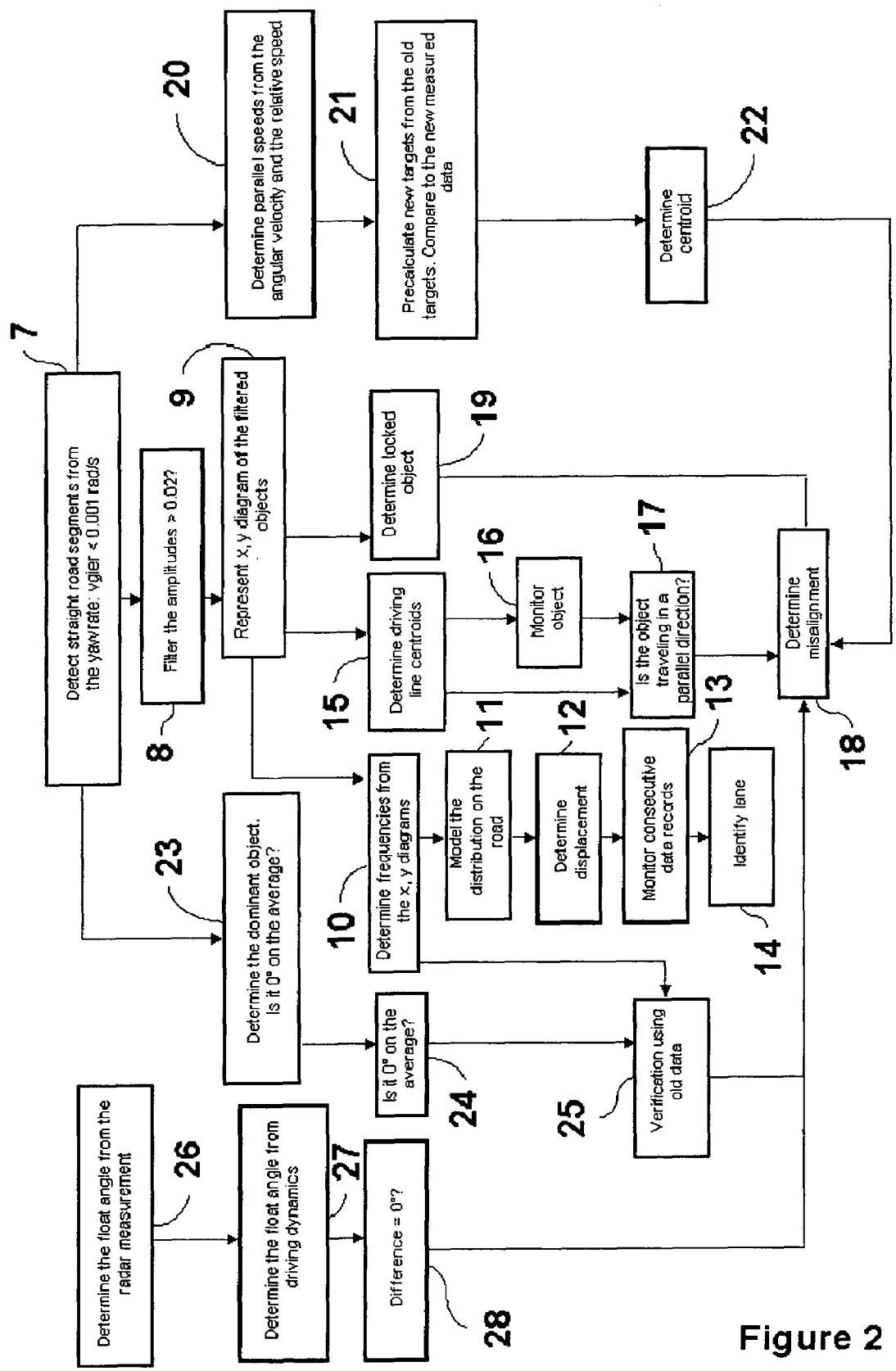
FIG. 2 shows design approaches for the lane determination and misalignment detection of the sensor.

FIG. 2 shows a flow chart suitable for lane analysis and misalignment detection of a radar sensor. In block 7, it is detected whether the vehicle is on a straight road segment. A yaw rate signal coming, for example, from a sensor for vehicle dynamics control can be used for this purpose. Furthermore, it is conceivable to also take a steering angle into consideration. If this yaw rate signal is less than 0.001 rad/s, it can be concluded that the vehicle is traveling on a straight road segment. In this case, the amplitudes are filtered in block 8 in order to only detect actual radar reflections and to eliminate noise. In block 9, these measured points are represented in an x,y diagram. In block 10, the frequency with which the objects were detected by the radar beam can be determined from the x,y diagram. In block 11, a distribution of the detected objects on the road can be modeled from this x,y diagram by generating a lateral distribution histogram. The displacement of the model produced in block 11 is then determined in block 12, the displacement making it possible to deduce the lateral deviation of one's own vehicle in the lane of travel. In block 13, the instantaneous lateral displacement histogram is compared to the previous histogram. A lane hypothesis identifying the lane currently being used can be output in block 14 by observing the changes in the data record in block 13. If it is detected in block 7 that the vehicle is on a straight road segment, the angle of the dominant object located in front of one's own vehicle is determined in block 23. The dominant object is advantageously the vehicle traveling in the same lane as one's own vehicle and having the least distance to one's own vehicle, therefore being decisive for the distance and speed control of one's own vehicle. Block 24 checks whether the angle of the dominant object determined in block 23 is approximately 0° as an average in time. If this condition of block 24 is met, a verification of the current data using old data from previous measurements is carried out together with the frequencies from the x,y diagram determined in block 10. If the current data is plausible on the basis of the verification performed in block 25, this data is used in the further course to determine a possible misalignment of the radar sensor in that this data is relayed to block 18. In block 19, an object that has been locked onto is then determined from the x, y diagram of the filtered objects determined in block 9. This locked object is a vehicle traveling directly ahead, whose distance to one's own vehicle and whose relative speed in relation to one's own vehicle are used for the distance and speed control. The position of this locked object is also relayed to block 18 to determine a possible misalignment. At the same time as step 19, the driving line centroids can be determined in block 15 from the x,y diagram of block 9. These driving line centroids represent the lateral displacement of the trajectories of vehicles moving in the middle of a particular lane. In block 17, it can be detected from these driving line centroids whether the objects in the radar detection range are moving parallelly to one's own vehicle, which is of particular interest for lane change maneuvers. Concurrently with this step, the dominant object can be separately observed in block 16 from the driving line centroids of step 15 and supplied to block 17, in that it is detected whether the detected objects are moving in a direction parallel to one's own vehicle. The information acquired in step 17 regarding the parallelism of the detected objects is supplied to the misalignment detection of the radar sensor in block 18. It is further advantageous in the case of a straight road segment detected in block 7 to determine the parallel speeds from the present radar data such as angular velocity and relative speed, as shown in block 20. These parallel speeds are the speeds of the detected objects in relation to one's own vehicle. In block 21, the new positions of the detected radar objects are then precalculated from these parallel speeds on the basis of the objects' old positions and trajectories. These precalculated targets are compared to the new measured data of the next measuring cycle and checked for plausibility. In step 22, a static centroid of the lateral displacements is determined from the data acquired in step 21, the centroid being supplied to block 18 and used there to determine a possible sensor misalignment. Block 26 then shows that a float angle of the vehicle is determined from the radar measurement. This is performed by monitoring the distances and the relative speeds of the radar objects. In a further step in block 27, the float angle of the vehicle is determined via a further device. This is advantageously carried out by using driving dynamics quantities from a device for driving dynamics control, which is already standard in most vehicles. The two float angles calculated in steps 26 and 27 are compared to one another in block 28, and a possibly existing difference between these two quantities is relayed to the sensor misalignment detection in block 18.

The flow chart shown in FIG. 2 partially includes a plurality of procedures and design approaches for determining a quantity. Thus, the determination of a misalignment (18) using a plurality of possibilities is shown. According to the present invention, it is sufficient to use in each case one of the indicated procedures to determine a lane or a sensor misalignment. It is also conceivable to combine two or more procedures, the individual results being capable of being compared to one another and checked for plausibility.

What is claimed is:

1. A method for a motor vehicle having an adaptive distance and speed control for lane allocation of vehicles on multi-lane roads, by using a model-based lane and misalignment detection, the method comprising:

acquiring radar object data from measured data of a radar sensor;

filtering the radar object data by at least one of (i) considering only once every object for a lateral displacement histogram, and (ii) considering every object with a weighting, the weighting depending upon how many times an object was detected in individual measurements;

registering the filtered data in a lateral displacement histogram, a frequency of the filtered object data being stored in the lateral displacement histogram as a function of the measured lateral displacement of the vehicle's longitudinal axis;

correlating an instantaneously determined, current lateral displacement histogram to every stored reference lane model, wherein a result of every correlation from the instantaneous lateral displacement histogram to one of the reference lane models is a correlation result that increases as a similarity of the instantaneous lateral displacement histogram increases as to the reference histogram;

selecting the reference histogram having a highest correlation to determine acquired information, which includes a number of lanes, a used lane, and a possible misalignment of the radar sensor; and outputting the acquired information for processing.

2. The method of claim 1, further comprising:
obtaining a histogram having a plurality of maxima according to a number of detected lanes and their relative position with respect to the vehicle in the used lane; determining a horizontal misalignment of the radar sensor from a position of average values for the lanes in the histogram with respect to a vehicle center axis, wherein in addition to a lateral displacement, a further histogram regarding a distance of an observed object is stored with an equivalent object treatment, and a misalignment angle is determined by determining a centroid of the histograms.

* * * * *

UNITED STATES PATENT AND TRADEMARK OFFICE
CERTIFICATE OF CORRECTION

PATENT NO.      : 7,593,838 B2                         Page 1 of 1
APPLICATION NO. : 09/980146
DATED           : September 22, 2009
INVENTOR(S)     : Winter et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 983 days.

Signed and Sealed this

Twenty-eighth Day of September, 2010

David J. Kappos
*Director of the United States Patent and Trademark Office*